(No Model.)

J. T. PENNYCOOK.
METALLIC GLAZING BAR.

No. 431,193. Patented July 1, 1890.

Witnesses
G. A. Tauberschmidt
J. McNamee

Inventor
J. T. Pennycook
By his Attorney
H. J. Tunis

UNITED STATES PATENT OFFICE.

JOHN T. PENNYCOOK, OF NEW YORK, N. Y., ASSIGNOR TO THE ALPHA GLASS AND METAL COMPANY, OF NEW JERSEY.

METALLIC GLAZING-BAR.

SPECIFICATION forming part of Letters Patent No. 431,193, dated July 1, 1890.

Application filed April 12, 1889. Serial No. 307,012. (No model.)

*To all whom it may concern:*

Be it known that I, JOHN T. PENNYCOOK, a citizen of Great Britain, residing at New York, in the county of New York and State of New York, have invented certain new and useful Improvements in Metallic Glazing-Bars; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to means for protecting plates of glass and the metal sash-bar or girders supporting the same in the roofs of various structures, wherein such glass plates and metal girders or sash-bars are employed; and the invention consists in combining a metal girder or sash-bar comprising a central upwardly-projecting rib and an integral flanged bottom with a ductile sheet-metal sheathing bent to cover the central rib and the upper concave surface of the bottom of the girder or sash-bar, and thence inwardly and upwardly upon opposite sides of the rib, and thence downwardly and outwardly upon the adjacent edges of glass plates, and a copper sheathing embracing the exterior face of the flanged bottom and having its inwardly-turned edge inserted between the edges of the glass plates and portions of the sheathing, as will be hereinafter fully described and claimed.

Figure 1:
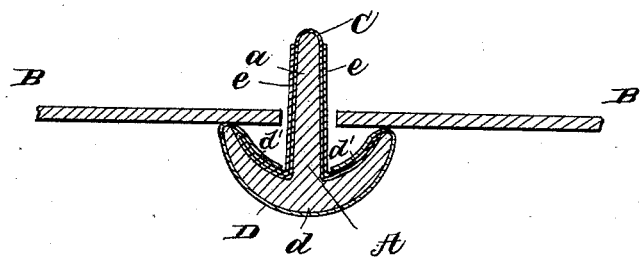
Figure 2:
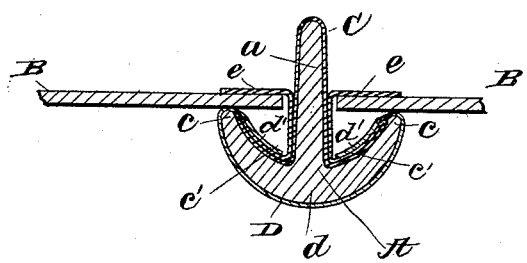

Figure 1 is a sectional view of the adjacent ends of two pieces of glass, showing the manner of placing the glass to protect it. Fig. 2 is a similar view showing the glass as it appears in place.

A represents a steel girder or sash-bar, which may be of any suitable shape, to support the glass lights B B.

C is a soft metal (preferably sheet lead) strip, which is bent over the girder-rib $a$ and follows the contour of the top of the girder to the flange-tip $c$, where it makes a return bend upon itself and follows the same course back again, the free ends $e\,e$ terminating at a point just below the top of the rib $a$.

A strip of copper D is bent around the lower portion or bottom $d$ of the girder, its free ends $d'\,d'$ terminating in the angles $c'\,c'$ of the lead sheathing C. This copper strip is of sufficient rigidity to serve the double purpose of securing the lead in place and at the same time of protecting the bottom portion of the girder and lower edge of the glass from the injurious action of the elements or deleterious gases. The girder being sheathed, as above described, and the glass placed in position, as shown in Fig. 2, the free ends $e\,e$ of the strip C are closed down over the glass, and the whole assumes the position shown in Fig. 2. It will thus be seen that the adjacent edges of the glass plates are cushioned against the lead and embraced by it, thus encompassing and protecting the glass, as well as preserving it from any injurious action.

My invention is particularly applicable to the roofs of car-sheds, depots, and the like, where large volumes of steam, sulphurous fumes, and other deleterious gases attack and rapidly destroy the roofs of the buildings, expanding and contracting the girders, so as to cause them to weaken and loosen, which action of the metals would be liable to crack the glass, all of which is prevented by my manner of protecting and preserving the parts.

Having thus described my invention, what I claim is—

The combination, with a metallic girder or sash-bar comprising a central upwardly-projecting rib and an integral flanged bottom, of a ductile sheet-metal sheathing bent to cover the central rib and the upper concave surface of the bottom of the girder or sash-bar, and bent thence inwardly and upwardly upon opposite sides of the rib, and thence downwardly and outwardly upon the adjacent edges of the glass plates, and a copper sheathing embracing the exterior face of the flanged bottom of said girder or sash-bar and having its inwardly-turned edges inserted between the edges of the glass plates and portions of the sheathing, substantially as specified.

In testimony whereof I affix my signature in presence of two witnesses.

JOHN T. PENNYCOOK.

Witnesses:
J. McNAMEE,
HENRY J. ENNIS.